US012639340B2

(12) United States Patent
Rangarajan et al.

(10) Patent No.: US 12,639,340 B2
(45) Date of Patent: May 26, 2026

(54) CONTEXT AND KNOWLEDGE SHARING ABSTRACTION ACROSS ENTITIES USING A RELATIONAL HIERARCHICAL KEY MAPPING SYSTEM

(71) Applicant: eBay Inc., San Jose, CA (US)

(72) Inventors: Hari Narayanan Rangarajan, San Jose, CA (US); Dyutimoy Sarkar, San Jose, CA (US); Rongting Chen, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/816,842

(22) Filed: Aug. 27, 2024

(65) Prior Publication Data

US 2026/0064724 A1 Mar. 5, 2026

(51) Int. Cl.
*G06F 16/28* (2019.01)
*G06F 9/54* (2006.01)

(52) U.S. Cl.
CPC .............. *G06F 16/288* (2019.01); *G06F 9/54* (2013.01)

(58) Field of Classification Search
CPC .... G06F 16/288; G06F 9/54; G06F 16/90335; G06F 16/21; G06F 16/2228; G06F 16/2237; G06F 16/2246; G06F 16/2255; G06F 16/258; H04L 43/045; H04L 63/10; H04L 63/107; H04L 9/0869; H04L 9/0872; H04L 9/32; H04L 9/3226; G05B 19/418; G05B 19/4185; G05B 19/41855; G05B 19/4186; G05B 2219/24155; G05B 2219/24167; G05B 2219/31342

(Continued)

(56) References Cited

U.S. PATENT DOCUMENTS 9,361,347 B2     6/2016  Boldyrev et al.
10,803,394 B2    10/2020  Costabello et al.
(Continued)

FOREIGN PATENT DOCUMENTS

CN         104636265 A      5/2015
CN         112000851 A     11/2020
(Continued)

OTHER PUBLICATIONS

AWS : "Realtime Fraud Detection powered by Redis Enterprise Cloud", Redis—AWS Reference Architecture, May 5, 2022. 1 page.
(Continued)

*Primary Examiner* — Md I Uddin
(74) *Attorney, Agent, or Firm* — Shook, Hardy & Bacon L.L.P.

(57) ABSTRACT

Some aspects of the present technology relate to technologies for context and knowledge sharing abstraction across entities using a relational hierarchical key mapping system. In accordance with some configurations, a first set of one or more data points for a first set of one or more keys is received at a first domain and stored in a schema-less data store. A second set of one or more data points for a second set of one or more keys is received at a second domain and stored in the schema-less data store. Based on at least one shared key, the first set of one or more data points and the second set of one or more data points are linked as a virtual entity such that a request to retrieve data points of the one or more data points is performed as a single seek and a single API call.

19 Claims, 8 Drawing Sheets

(58) Field of Classification Search

USPC ............ 707/706, 798, 802, 803, 812, 999.1, 707/999.101, E17.044, 738, 756, 602, 707/652, 661, 687, 713, 714, 736

See application file for complete search history.

(56) References Cited

U.S. PATENT DOCUMENTS

| | | | |
|---|---|---|---|
| 10,824,761 | B2 | 11/2020 | Phillips |
| 10,877,998 | B2 | 12/2020 | Jagannatha et al. |
| 10,904,289 | B2 | 1/2021 | Tsironis |
| 10,911,241 | B2 | 2/2021 | Struttmann et al. |
| 10,938,817 | B2 | 3/2021 | Han et al. |
| 11,184,374 | B2 | 11/2021 | Shu et al. |
| 11,693,958 | B1 | 7/2023 | Steiman |
| 2011/0112931 | A1 | 5/2011 | Hu et al. |
| 2014/0089273 | A1* | 3/2014 | Borshack .............. G06F 16/137 |
| | | | 707/821 |
| 2015/0088924 | A1* | 3/2015 | Abadi .............. G06F 16/90335 |
| | | | 707/769 |
| 2016/0098037 | A1* | 4/2016 | Zornio .................. H04L 43/045 |
| | | | 700/20 |
| 2016/0203036 | A1 | 7/2016 | Mezic et al. |
| 2017/0068748 | A1 | 3/2017 | Hu et al. |
| 2020/0175173 | A1 | 6/2020 | Krishnamoorthy |
| 2020/0320619 | A1 | 10/2020 | Motaharian et al. |
| 2021/0400064 | A1 | 12/2021 | Bitton et al. |
| 2022/0245470 | A1 | 8/2022 | Acharya et al. |
| 2022/0269601 | A1* | 8/2022 | Monteith .............. G06F 3/0652 |
| 2023/0100883 | A1 | 3/2023 | Luus et al. |
| 2023/0161645 | A1 | 5/2023 | Srivastava et al. |
| 2023/0281687 | A1 | 9/2023 | Bhardwaj et al. |
| 2024/0007342 | A1 | 1/2024 | Gupta et al. |
| 2024/0169214 | A1 | 5/2024 | Wu et al. |
| 2025/0278644 | A1 | 9/2025 | Thomas et al. |

FOREIGN PATENT DOCUMENTS

| | | |
|---|---|---|
| CN | 112506983 A | 3/2021 |
| CN | 113727351 B | 3/2024 |
| WO | 2023/006215 A1 | 2/2023 |

OTHER PUBLICATIONS

Daniel et al., "UMLto[No]SQL: Mapping Conceptual Schemas to Heterogeneous Datastores", ResearchGate, May 2019, 13 pages.

DynamoDB : "What is a Key-Value Database?", Available at : <https://aws.amazon.com/nosql/key-value/>, pp. 1-10.

Goh, T., "Table Hierarchy: The Hidden Gem of Oracle NoSQL Database—Part 1", Oracle NoSQL Database, Feb. 17, 2023, pp. 1-12.

GraphScope : "Categories, Languages and Systems of Graph Computing", Graphscope Blog, Available at : <https://graphscope.io/blog/tech/2023/05/25/Categories-Languages-and-Systems-of-Graph-Computing>, May 25, 2023. pp. 1-11.

MongoDB., "Key-Value Databases", Available at : <https://www.mongodb.com/resources/basics/databases/key-value-database>, 2024, pp. 1-9.

Ramzan et al., "An Intelligent Approach for Handling Complexity by Migrating from Conventional Databases to Big Data", symmetry, vol. 10, No. 698, Dec. 3, 2018, pp. 1-20.

Souza et al., "Conceptual Mappings to Convert Relational into NoSQL Databases", ICEIS 2016—ResearchGate, vol. 1, Jan. 2016, 9 pages.

Sprem et al., "Building Advanced Web Applications Using Data Ingestion and Data Processing Tools", Electronics, vol. 13, No. 709, 2024. pp. 1-23.

Non-Final Office Action received for U.S. Appl. No. 18/747,145, mailed on Sep. 30, 2025, 23 pages.

Final Office Action received for U.S. Appl. No. 18/747,145, mailed on Feb. 2, 2026, 27 pages.

\* cited by examiner

200

300

900

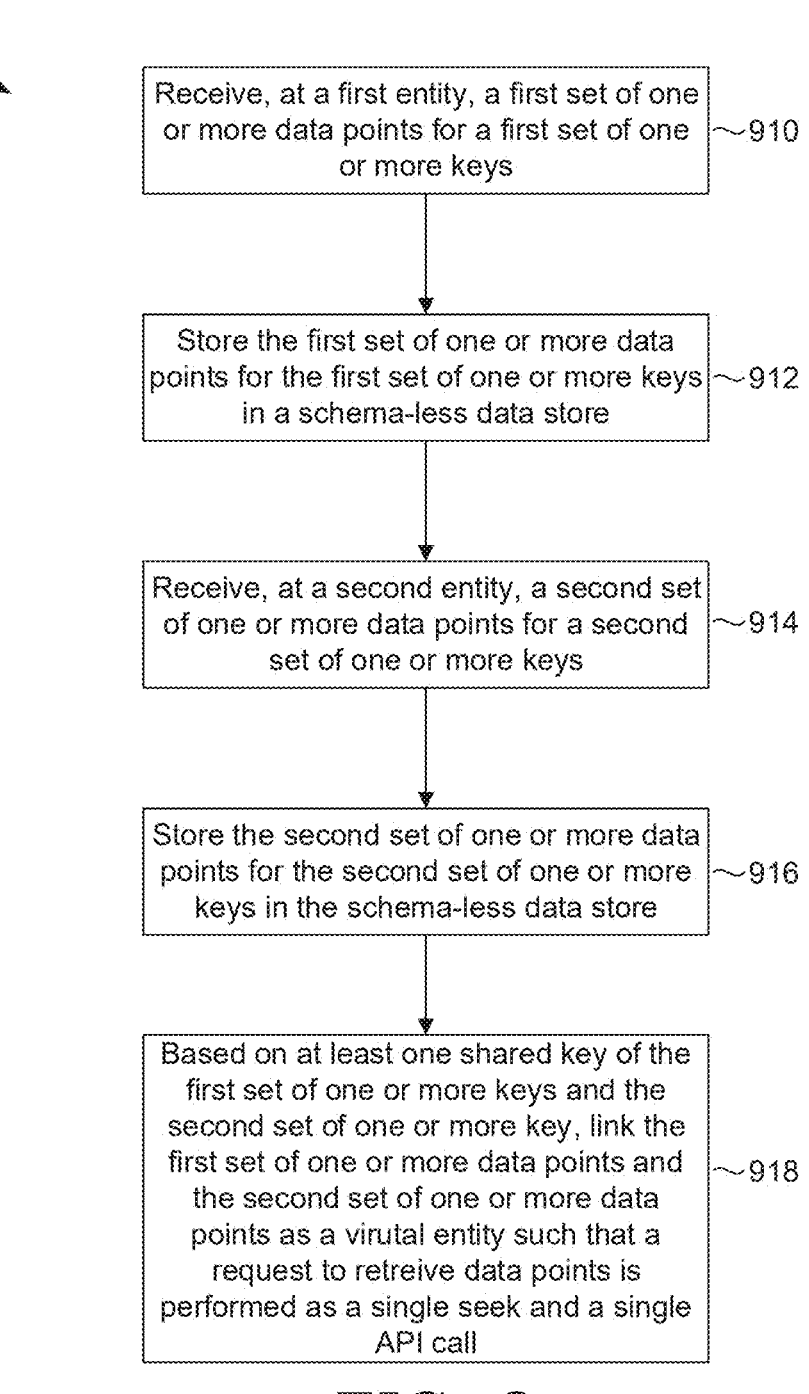

Receive, at a first entity, a first set of one or more data points for a first set of one or more keys  ~910

Store the first set of one or more data points for the first set of one or more keys in a schema-less data store  ~912

Receive, at a second entity, a second set of one or more data points for a second set of one or more keys  ~914

Store the second set of one or more data points for the second set of one or more keys in the schema-less data store  ~916

Based on at least one shared key of the first set of one or more keys and the second set of one or more key, link the first set of one or more data points and the second set of one or more data points as a virutal entity such that a request to retreive data points is performed as a single seek and a single API call  ~918

MEMORY

1012

PROCESSOR(S)

1014

PRESENTATION COMPONENT(S)

1016

RADIO(S)

1024

I/O PORT(S)

1018

I/O COMPONENTS

1020

POWER SUPPLY

1022

1010

CONTEXT AND KNOWLEDGE SHARING ABSTRACTION ACROSS ENTITIES USING A RELATIONAL HIERARCHICAL KEY MAPPING SYSTEM

BACKGROUND

Schema-less databases (e.g., NoSQL) are a go-to solution for many use-cases because of their ability to scale and schema-less flexibility. However, most applications require many of the standard Structured Query Language (SQL) features to implement business logic and functionality. Techniques used to overcome this limitation include denormalization or reference embedding for joins. These techniques typically rely on a custom application layer schemas for governance. Although these practices are well-established techniques, developers have to be engaged significantly in the schema definition, layout, and the associated embedding/referencing data in anticipation of query behavior and subsequent coding implementations across microservices, as well as continued maintenance. In large organizations, the use of schemas necessitates cross functional alignment and performance considerations so each domain within an organization is aware of all schema definitions, layouts, and the associated embedding/referencing data that will be shared across domains.

SUMMARY

Some aspects of the present technology relate to, among other things, context and knowledge sharing abstraction across entities using a relational hierarchical key mapping system. In accordance with some configurations, a first set of one or more data points for a first set of one or more keys is received at a first domain and stored in a schema-less data store. A second set of one or more data points for a second set of one or more keys is received at a second domain and stored in the schema-less data store. Based on at least one shared key, the first set of one or more data points and the second set of one or more data points are linked as a virtual entity such that a request to retrieve data points of the one or more data points is performed as a single seek and a single application programming interface (API) call.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 9 is a flow diagram showing a method for context and knowledge sharing abstraction across entities using a relational hierarchical key mapping system, in accordance with some implementations of the present disclosure.

DETAILED DESCRIPTION

Figure 1:
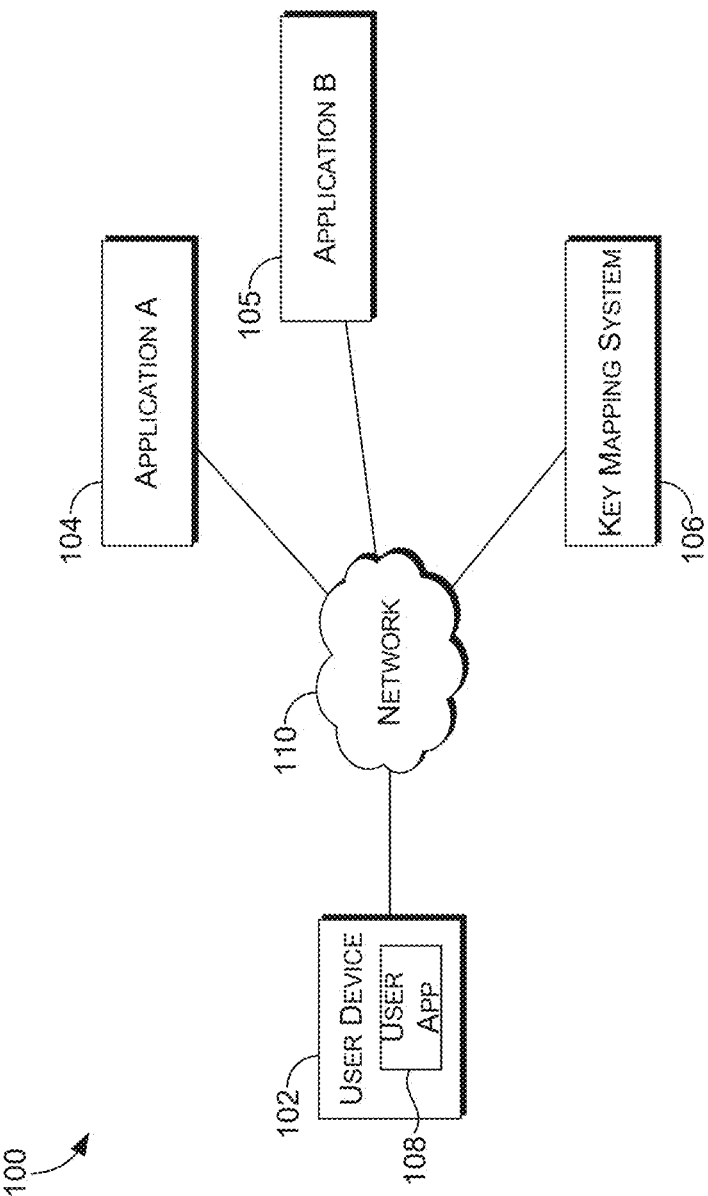
FIG. 1 is a block diagram illustrating an exemplary system, in accordance with some implementations of the present disclosure.

The continued growth of online applications (including, for instance, e-commerce and other systems that support online transactions) presents a particular challenge for storing and retrieving data. Conventional approaches for managing data utilize various architectures that struggle with scale and/or efficiency. For example, some approaches store data corresponding to user interactions in relational databases. Though these approaches may be effective for small amounts of data, they are unable to perform read/write operations at a speed and scale required by online transaction platforms. Moreover, these approaches are unable to effectively link data which results in a large number of redundancies.

Consider an example where there is an entity model where entities include user, user preference user behavior profile, and user device profile. There may be practical business needs where all entities related to user (e.g., user, user preference user behavior profile, and user device profile) need to be accessed at the same time to process some business request. If this is modeled as schemas in a relational database, for example, the schemas may be defined as shown in table 1 below:

TABLE 1

| User Schema userId | User Preference userid | User Behavior user id | User Device Profile userid |
|---|---|---|---|
| registrationdatae | notifciation_opted | avg_time_spent | deviceid |
| address | OTP_delivery | typing_speed | device_token |
| emailaddress | language | most used device | device_type |
| phone | preferred_device | browser_signatures | biometric_enabled |
| | | screen_resolution | |

There may not be a single business domain that manages each of these schemas. A domain may represent an application used by a business, a business unit of the business, or any other scenario where data points may be received without regard to a uniform schema. For example, a first domain (e.g., managed registration domain) may manage the user schema and user preference schemas. A second domain (e.g., behavioral biometrics domain) may manage the user behavior schema. A third domain (e.g., device registration domain) may manage the device profile schema. In this setup, particularly in a scenario where this pattern is repeated for different sets of schema families, a large number of fetches is needed to retrieve data stored across a particular schema family.

Continuing the user schema family, in a Representational State Transfer (REST) model, three sets of schemas must be exposed via three services. The consumer business logic of these three sets of data needs to make three application programming interface (API) calls, which in turn makes three database seeks. In contrast, in a GraphQL model, the number of API calls can be optimized from three to one; however, there will still be three database seeks. This process unnecessarily consumes various computing resources, such as processing power, network bandwidth, throughput, memory consumption, etc. In some instances, the multiple seeks may even completely fail to satisfy the business goal, thus requiring a user to spend even more time and computing resources on the process by repeating the process of issuing additional API calls or queries until the user finally accesses the desired data. In some cases, the user may even give up searching because the user is not aware of the underlying schema and is unable to return the desired data after multiple API calls or queries.

These shortcomings of existing systems adversely affect computer network communications. For example, each time a query is received, contents or payload of the queries is typically supplemented with header information or other metadata, which is multiplied by all the additional queries needed to obtain the particular data the user desires to retrieve. As such, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. This decreases throughput and increases network latency, and can waste valuable time.

Aspects of the technology described herein improve the functioning of the computer itself in light of these shortcomings in existing systems by providing a solution that enables a key management system to perform data operations on a schema-less storage backend in a specification language that scales to distributed schema management. Moreover, storing and retrieving can be accomplished by leveraging an efficient API paradigm. A decoupled/distributed approach to data specification inverts the entity→attribute relationship to an attribute←key relationship. By way of example, in a typical entity→attribute model, a schema is first defined for the entity and then attributes are assigned accordingly. In contrast, the attribute←key model enables the attributes to be assigned to a key and an aggregate clustering of multiple attributes to a key (or keyset) results in the inference of a virtual entity. As can be appreciated, better results are achieved compared to traditional systems that require multiple queries, data seeks, and/or API calls.

Aspects of the technology described herein provide a number of improvements over existing store management systems. For instance, computing resource consumption is improved relative to existing technologies. Using a distributed schemaless model (and no centralized entity specification), the key mapping system automatically derives and maintains a virtual (abstract) entity and enables end users to translate business requirements directly into a simple specification (i.e., no elaborate data model reviews and no single point of ownership for a schema). A named attribute data storage and key relationship hierarchy allows data retrieval with only a partial keyset (automatic path-finding and context based primary key resolution). This also allows exposure and discovery of a federated data (attributes) space without tight coupling of software components or building private silos of data. Moreover, aspects of the technology describe herein eliminates the need multiple search queries, data seeks, and/or API calls. The techniques described herein have been demonstrated to provide marked improvement over previous approaches and do so at scale and without regard to a schema.

For example, and continuing the user schema family above, the key mapping system abstracts a virtual entity called user and stores the data related to user, user preference, user behavior, and user device profile as one denormalized record. This enables the data to be retrieved in one API call and one seek rather than three. Even where data from other virtual entities or related virtual entity families is required, the key mapping system arrives at a few virtual entities and organizes the data to be fetched with minimal database seeks, thereby improving the performance of the computer itself. Accordingly, aspects of the technology described herein decrease computing resource consumption, such as processing power and network bandwidth. For instance, a query, data seek, and/or API call would only need to be made a single time (or fewer times relative to existing technologies).

In like manner, aspects of the technology described herein improve storage device or disk I/O and query execution functionality. As described above, the data silos and schemas of conventional systems results in repetitive reads and writes and storing repetitive instances of data. Moreover, retrieving data requires multiple queries, data seeks, and/or API calls. This causes excessive disk usage and multiple traversals to disk I/O. In contrast, aspects described herein reduce storage device I/O because the data is schemaless and there are no repetitive instances of data so the computing system does not have to reach out to the storage device as often to perform a read or write operation. Accordingly, there is not as much wear due to multiple search queries, data seeks, and/or API calls.

With reference now to the drawings, FIG. 1 is a block diagram illustrating an exemplary system 100 for context and knowledge sharing abstraction across entities using a relational hierarchical key mapping system, in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, application A 104 and application B 105 (e.g., an online transaction platform), and a key mapping system 106. Each of the user device 102, application A 104, application B 105, and the key mapping system 106 shown in FIG. 1 can comprise one or more computer devices, such as the computing device 1000 of FIG. 10, discussed below. As shown in FIG. 1, the user device 102, application A 104, application B 105, and the key mapping system 106 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, application A 104, application B 105, and the key mapping system 106 could each be provided by multiple server devices collectively providing the functionality of the application A 104, application B 105, and the key mapping system 106 as described herein. Additionally, other components not shown may also be included within the network environment.

The user device 102 can be a client device on the client-side of operating environment 100, while application A 104, application B 105, and the key mapping system 106 can be on the server-side of operating environment 100. Application A 104, application B 105, and the key mapping system 106 can each comprise server-side software designed to work in conjunction with client-side software on the user device 102 so as to implement any combination of the features and functionalities discussed in the present disclosure. For instance, the user device 102 can include a user application 108 for interacting with the application A 104, application B 105, and/or the key mapping system 106. The user application 108 can be, for instance, a web browser or a dedicated application for providing functions, such as interacting with application A 104, application B 105, and/or the key mapping system 106. This division of operating environment 100 is provided to illustrate one example of a suitable environment, and there is no requirement for each implementation that any combination of application A 104, application B 105, and/or the key mapping system 106 remain as separate entities. For instance, in some aspects, key mapping system 106 is a part of Application A 104 and/or Application B 105. While the operating environment 100 illustrates a configuration in a networked environment with a separate user device, online transaction platform, and fraud detection system, it should be understood that other configurations can be employed in which aspects of the various components are combined.

The user device 102 may comprise any type of computing device capable of use by a user. For example, in one aspect, a user device may be the type of computing device 1000 described in relation to FIG. 10 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with application A 104, application B 105, and/or the key mapping system 106 via the user device 102.

Application A 104 and/or application B 105 can be implemented using one or more server devices, one or more platforms with corresponding application programming interfaces, cloud infrastructure, and the like. For example, application A 104 and/or application B 105 may comprise any computer-based system that facilitates electronic transactions over the network 110 via user devices, such as the user device 102. In some aspects, application A 104 and/or application B 105 comprises a listing platform (e.g., an e-commerce platform) that generally provides, to the user device 102, item listings describing items (physical or digital) available for purchase, rent, streaming, download, etc., and facilitates electronic purchase transactions for items. In other aspects, application A 104 and/or application B 105 comprises a payment platform that facilitates electronic payment transactions between two accounts. In still further aspects, application A 104 and/or application B 105 comprises a banking platform that facilitates the electronic transfer of money between accounts. Although illustrated separately, application A 104 and application B 105 can be the same application. For example, application A 104 may refer to a first instance or use case of an application, while application B 105 may refer to a second instance or use case of the same application.

As described in further detail below, the key mapping system 106 provides context and knowledge sharing abstraction across entities using a relational hierarchical key mapping system between various applications, such Application A 104 and Application B 105. The key mapping system 106 can be implemented using one or more server devices, one or more platforms with corresponding application programming interfaces, cloud infrastructure, and the like. While the key mapping system 106 is shown separate from Application A 104, Application B 105, and the user device 102 in the configuration of FIG. 1, it should be understood that in other configurations, some of the functions of the key mapping system 106 can be provided by Application A 104, Application B 105, and the user device 102.

In some aspects, the functions performed by components of the key mapping system 106 are associated with one or more applications, services, or routines. In particular, such applications, services, or routines may operate on one or more user devices, servers, may be distributed across one or more user devices and servers, or be implemented in the cloud. Moreover, in some aspects, these components of the key mapping system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The key mapping system 106 provides a semantic framework to perform data operations on a schema-less storage backend. The key mapping system 106 scales to distributed schema management and enables a read/write API that implicitly captures the notion of linked or joined keys associated with a data point.

Figure 2:
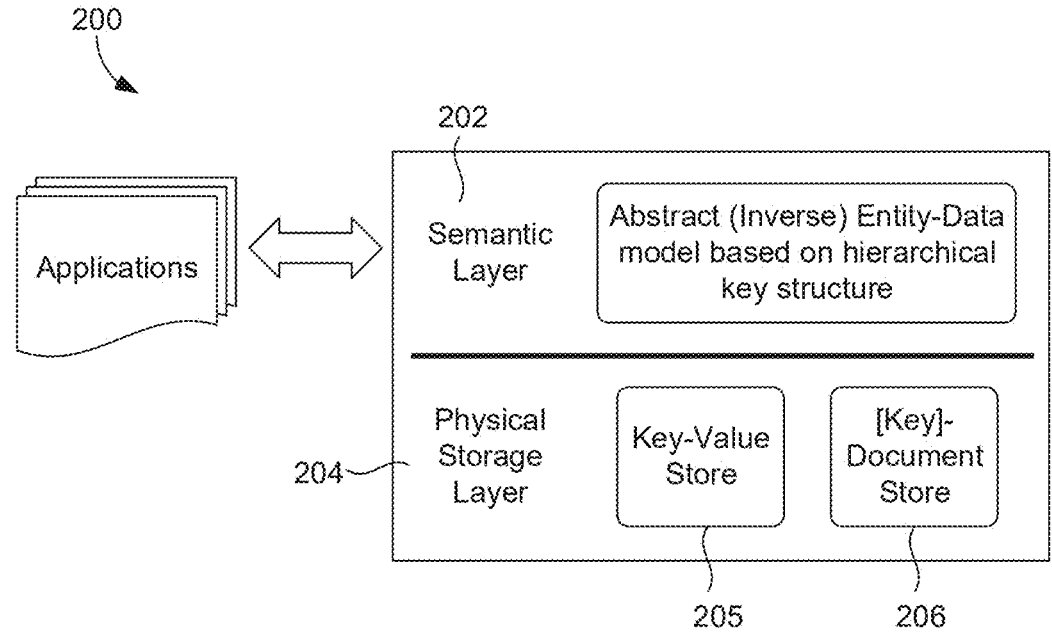
FIG. 2 is a diagram showing an example of a semantic framework of the key mapping system, in accordance with some implementations of the present disclosure.

FIG. 2 depicts a diagram 200 of an example of a semantic framework of the key mapping system, in accordance with some aspects of the technology described herein. As shown, a semantic layer 202 comprises an attribute←key model. In this way, application(s) 201 can read or write attributes that are assigned to one or more keys. The aggregation of multiple attributes to a key (or keyset) results in the inference of a virtual entity. Below, a physical storage layer 204 comprises a key-value store 205 and a [key]-document store 206. The key-value store 205 and the [key]-document store 206 provides a hierarchical key structure to the entity-key model. This framework provides SQL-like semantics but uses a schema-less storage platform. For example, in SQL, there would be an entity and a set of fields. Some of the fields might be keys and some of the fields might be attributes. However, the semantic framework stores attributes in federated space and then keys are associated to these attributes. In other words, any end user (developer) can define its own attributes and associate keys to these attributes for applications 208. In this way, the application developers work directly at the semantic layer and the underlying storage layer is decoupled.

To illustrate, assume an end user assigns attribute1 and attribute2 to keyA for an application of the applications 208. Although there is no entity in this model, internal storage can map the attributes associated with keyA to virtual entity. However, no entity is ever actually specified; rather, this is organically inferred by key mapping system. In practice, the API presented to the end user enables the end user to declare an attribute and a key mapping. At run-time, write operations utilize the key mapping and associate the attribute to the key. Read operations may operate on one or more keys and disambiguate to the most appropriate data point. Moreover, multiple attributes can be read or written in bulk and the key mapping system resolves the appropriate relation linkage. Although described using primary and secondary keys, in some aspects, the process can be extended to tertiary keys and beyond.

For example, if the primary key is available, it is used to query the attribute value in storage. In this scenario, at most one value will be found in storage. On the other hand, if the primary key is not available but a secondary key is available, multiple data points may be found. A first option is to select the data point that matches the current scenario (i.e., matches the most secondary keys). A second option is to select the data point with the most desired attribute for the particular business case. A third option, which may result in the lowest latency, may be to select the data point based on some ordering (e.g., user defined, statistics based). A fourth option may be to use each secondary key individually to retrieve sets of datums and combine the results using some operation (e.g., set intersection). A fifth option may be to let the user specify in the query (e.g., rules) to determine which secondary key to use.

Figure 3:
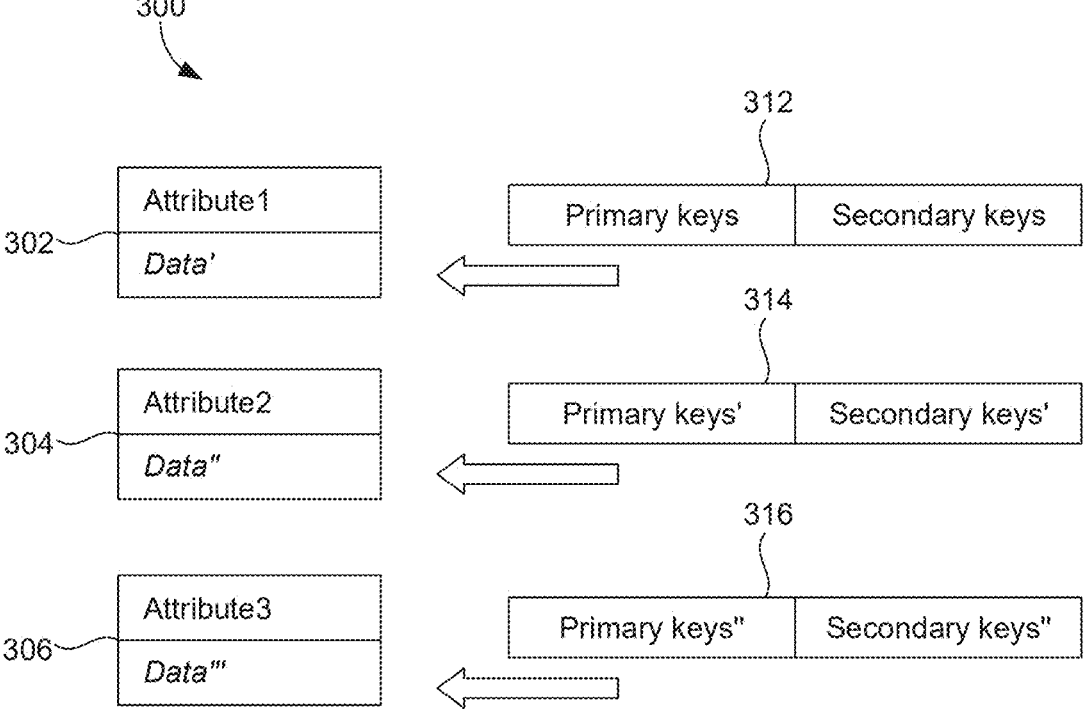
FIG. 3 is an example of a data specification model of the key mapping system, in accordance with some implementations of the present disclosure.

Referring now to FIG. 3, an example of a data specification model 300 of the key mapping system is illustrated, in accordance with some implementations of the present disclosure. Initially, a user specifies a list of attribute mappings. The attributes can be mapped to a primary and secondary key combination. In aspects, the data or attributes can be specified in multiple formats (e.g., scalar, vector, subtyped object array). To illustrate, Attribute1 (Data') 302 may be mapped to Primary and Secondary keys 312, Attribute2 (Data") 304 may be mapped to Primary and Secondary keys 314, and Attribute3 (Data'") 306 may be mapped to Primary and Secondary keys 316. When a particular application or business logic writes data or attribute against a key, the application or business logic does not need to understand any schema or entity. Rather, the application or business logic only needs to know the data and the key.

Figure 4:
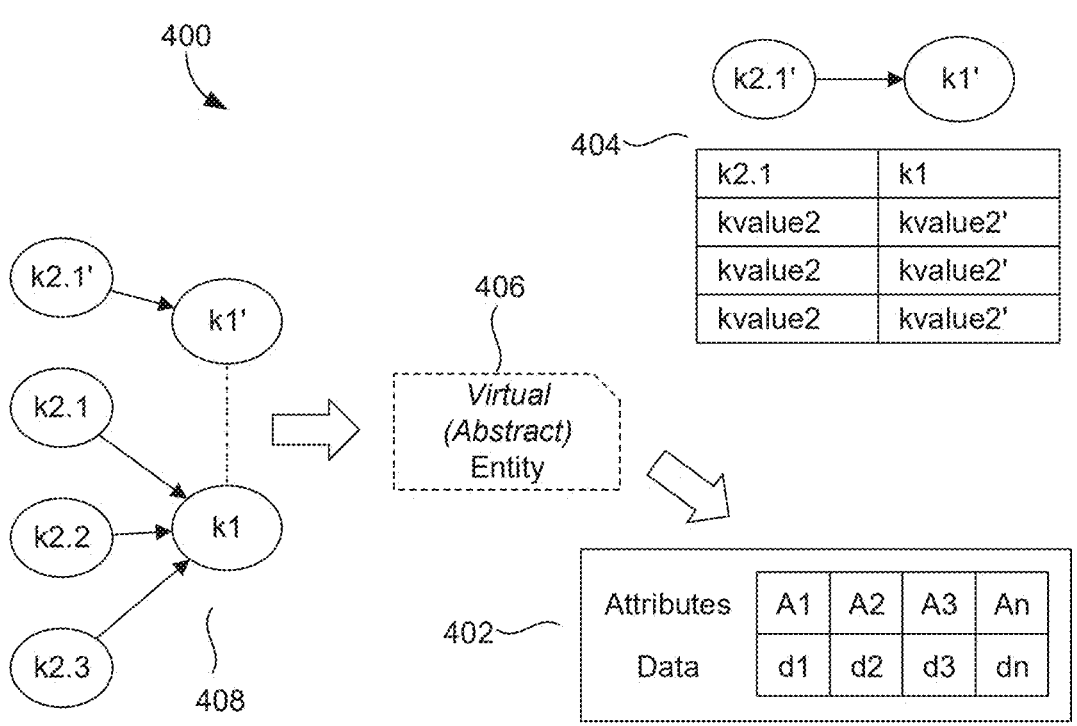
FIG. 4 is a diagram of an example attribute←key mapping, in accordance with some implementations of the present disclosure.

FIG. 4 depicts a diagram 400 of an example attribute←key mapping, in accordance with some implementations of the present disclosure. Initially, a user defines particular attributes 403 to associate with keys 401, 402. Moreover, the user may associate key 404 to another key 405. As a result, a hierarchical key network 408 is created by rebuilding the information comprising the attributes and associated keys into a compacted tree. Edge value mapping is maintained between keys of the compacted tree. Additionally, a virtual (abstract) entity 406 is created. In aspects, the virtual (abstract) entity 406 obviates the need for joins because the virtual (abstract) entity 406 leverages routing tables or key linking to effectively act as a real-time join, without requiring the overhead of a true SQL join. To create, the routing tables or key linking, the key mapping system derives the most optimal way of representing the fifth normal form (5NF). In aspects, each write operation automatically creates the key linking to the data for multi-hop key traversals. During retrieval, user may request data 410 from hierarchical key network 408 by virtue of virtual (abstract) entity 406.

Figure 5:
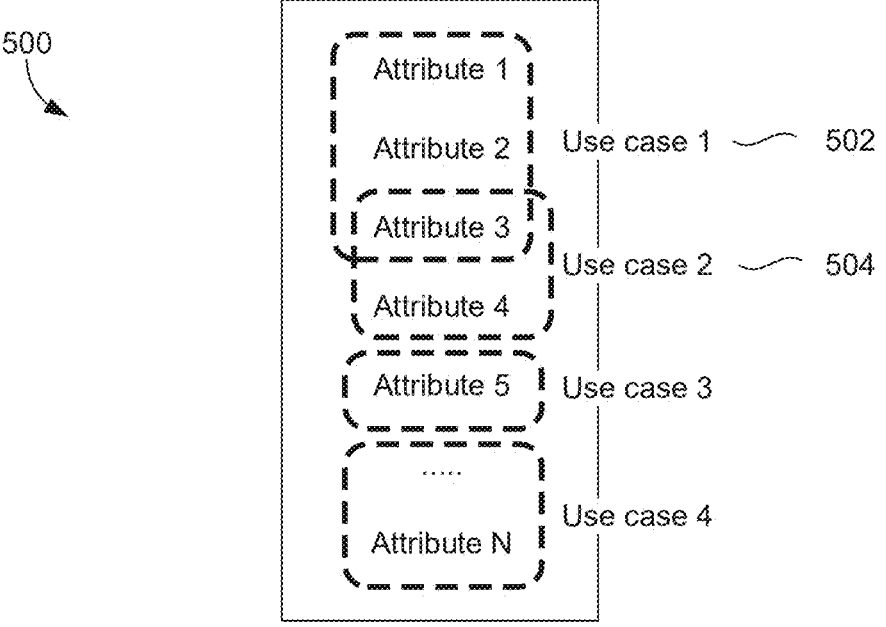
FIG. 5 is an example of a virtual entity layout, in accordance with some implementations of the present disclosure.

Referring now to FIG. 5, an example of a virtual entity layout 500 is illustrated, in accordance with some implementations of the present disclosure. In a traditional entity data model, there is usually one owner for the model with others adding attributes based on policy and governance. This arrangement creates friction if attribute policies do not match across different usages. For example, an entity may be created that includes attributes with personally identifiable information (PII). Although a first use case may be authorized to use PII, a second use case may not be authorized to use PII. As a result, in the traditional entity model, multiple entities would need to be created with duplicate attributes (both use cases need to create an entity with at least one overlapping attribute in order to protect PII).

In contrast, the key mapping system is a decentralized system that creates a virtual entity in real-time and enables each use case to subscribe to a sub-set of attributes within a single virtual entity. For example, as shown, use case 1 502 and use case 2 504 each use attribute 3. Rather than creating separate entities for each use case, use case 1 502 and use case 2 504 each subscribe to attribute 3. The key mapping system manages isolations and appropriate policy governance via validated key linking. For example, use case 3 506 uses attribute 5, which is not used by any other use case.

Similarly, use case 4 508 uses attribute N, which is not used by any other use case. Even though each of use case 3 506 and use case 4 508 are part of the same virtual entity, use case 3 506 cannot access attribute N and use case 4 508 cannot access attribute 5.

In some aspects, multiple data points for the same virtual entity are required simultaneously. For clarity, a data point refers to any name value pair denoting a data attribute. A data point can be scalar or vector (e.g., username=john, dob=1969 Jan. 1, preferred devices=[mobile(ios), ipad (ios)]). To support fast retrieval, key mapping system aggregates data points that belong to the same virtual entity. Since these data points are aggregated according to entity, all data points for the same virtual entity can be retrieved with only one disk seek, rather than one disk seek for each data point. In some aspects, virtual entity attributes are stored with spatial optimality for improved temporal read/write performance.

In some aspects, while onboarding an application as a writer for any data points, the key mapping system maintains metadata about what data points can be written by a particular application for a particular key. The key mapping system may allow tokens to be passed by application to the API that allows writes (or reads) or denies writes (or reads).

In some aspects, attributes corresponding to a virtual entity may need to be accessed by one or more alternate keys. This allows the data to be accessed easily by various applications. To do so, key mapping system enables a user to create alternate keys pointing to a key which is the main custodian of the data points of the virtual entity. This is like a secondary index in a noSQL database or a unique key in a relational table or other type of index. In some aspects, primary keys and/or alternate keys can be replaced or updated.

Figure 6:
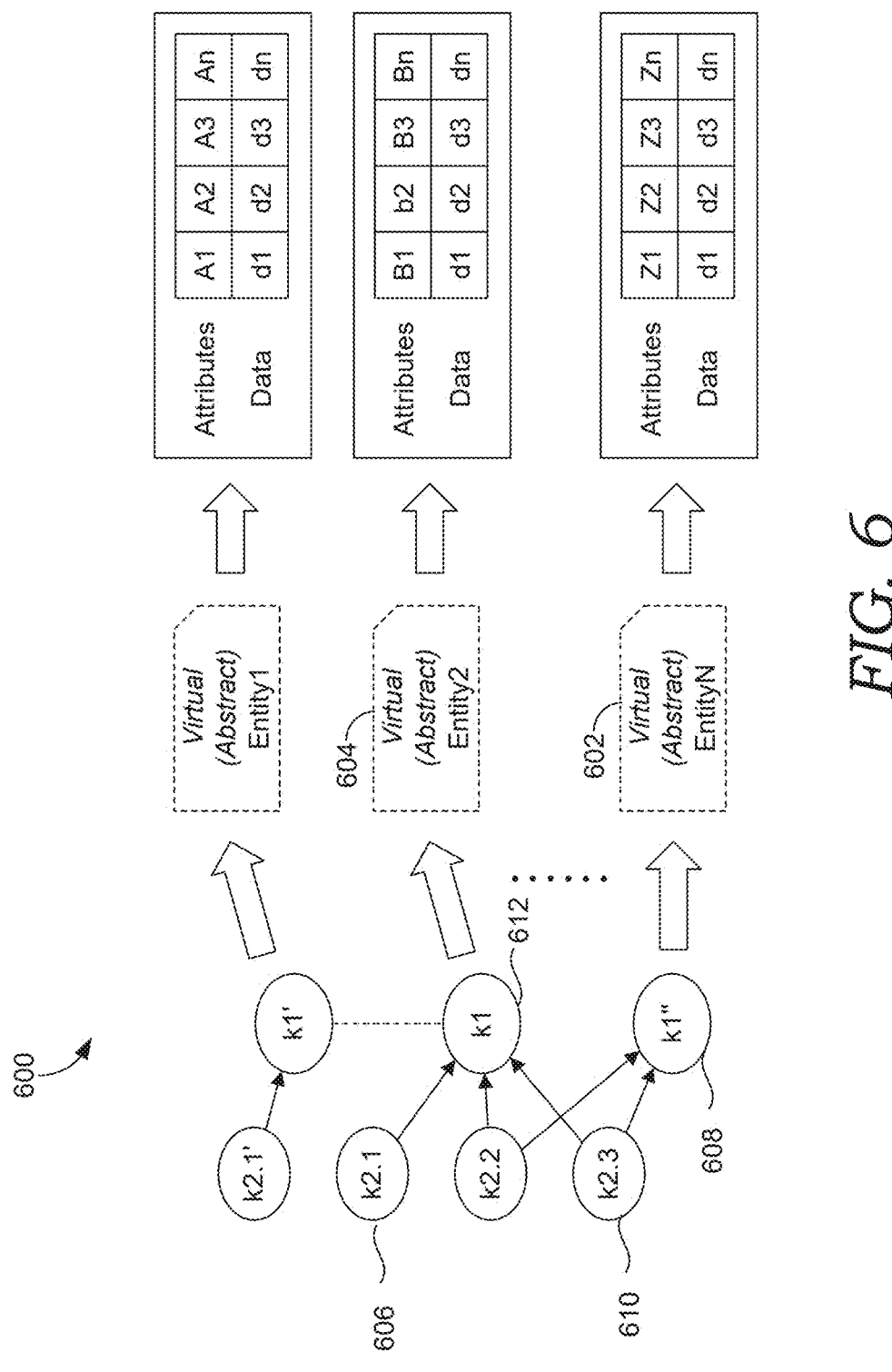
FIG. 6 is a diagram of an example key-abstracted context sharing and knowledge network, in accordance with some implementations of the present disclosure.

FIG. 6 depicts a diagram 600 of an example key-abstracted context sharing and knowledge network, in accordance with some implementations of the present disclosure. As shown, the relationship hierarchy is a directed acyclic graph (DAG), and there can be multiple paths from the query keyset to the targeted attribute. To select the best path from the query keyset, the key mapping system picks a primary key that is the most traversed on the path from keys 610, 612, 614, 616, 618, 620, 622 in the keyset to the attribute. In generalized graph terms, this can be thought of as a shortest path tree (SPT) rooted at the attribute (target) node, with primary keys as immediate one-hop nodes. For each key in the query keyset, a score is incremented for each primary key if there is a path from the particular key to the primary key. The primary key with the highest score is selected. In the case of a tie, the tie can be broken arbitrarily or based on more specific application layer criteria that helps with performance optimization.

By way of example, suppose a user wants to retrieve a set of data points 630, 632, 634. For each attribute in each set of data points 630, 632, 634, the key mapping system picks a primary key that is the most traversed on the path from keys 610, 612, 614, 616, 618, 620, 622 in the keyset to the attribute. Since the attributes in each set of data points 630, 632, 634, are associated by keys in the keyset, a virtual entity 602, 604, 606 can be inferred because the data points are aggregated and enabled to be retrieved in a single seek.

In some aspects, the key hierarchy connections are managed independently of the attribute write path. This allows dynamic activation of key links in a post-hoc manner. For example, there can be a write (primary key, attribute). At a later time, the connection (secondary key, primary key) as specified in the key hierarchy linkage can be activated with a key-linking API. A query (attribute, [secondary key]) retrieves the written data via best path routing. For example, in an online transaction platform, a user may purchase an item and checkout as a guest, rather than create a user account. However, some user level data (e.g., risk decisions) can be captured during guest checkout. Although a user account is not created yet, the key mapping system captures the user level data and links it to other keys (e.g., IP address, device identification, user email, etc.) When the account is created, it can be linked to the other keys.

Figure 7:
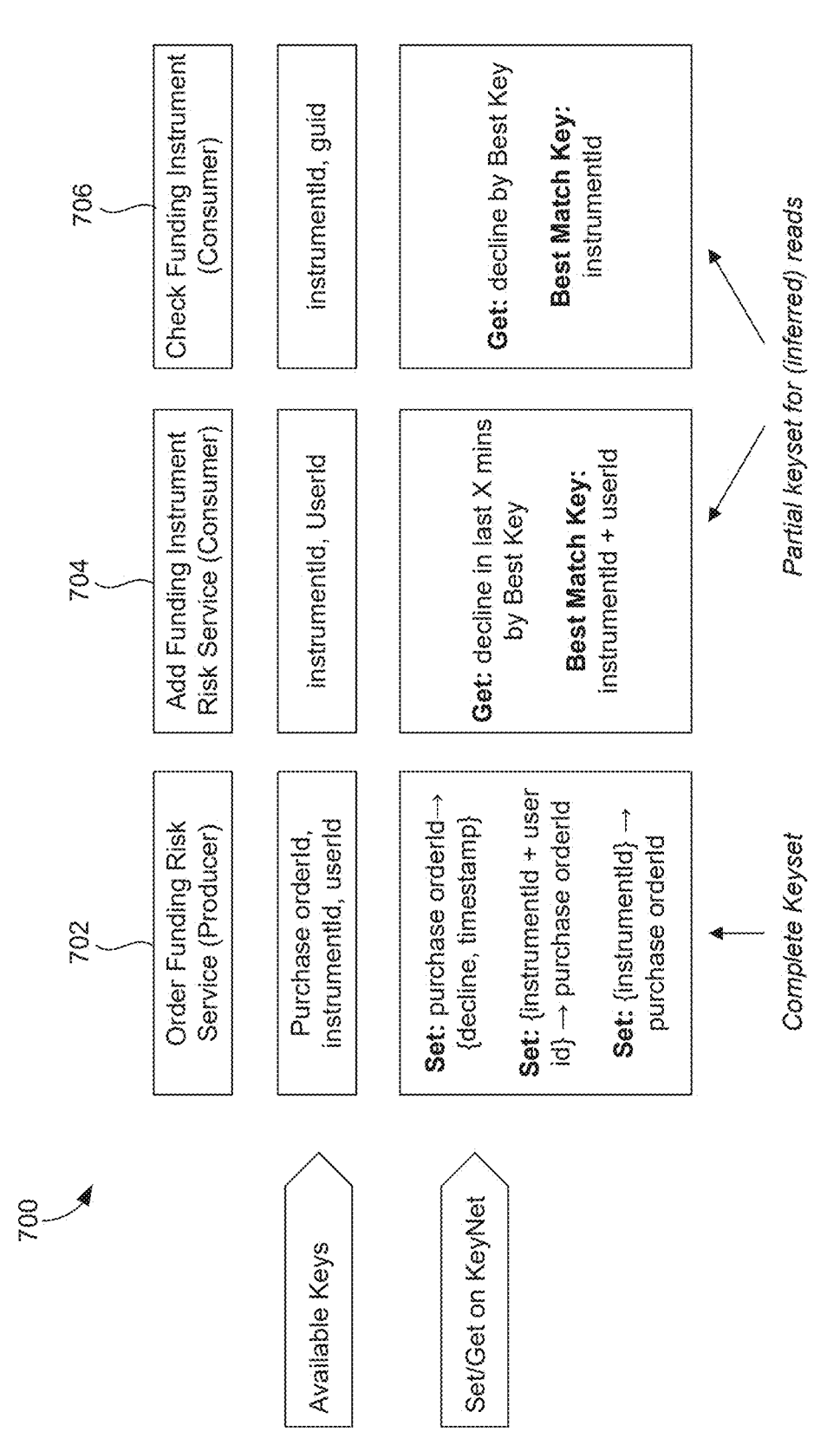
FIG. 7 is a diagram showing an example of a distributed microservice system where disparate flows have different sets of keys, in accordance with some implementations of the present disclosure.

Referring now to FIG. 7 depicts a diagram 700 of an example of a distributed microservice system where disparate flows have different sets of keys, in accordance with some aspects of the technology described herein. As shown, disparate flows 702, 704, 706 have different sets of keys. However, key mapping system enables data to be retrieved in all flow sequences without the complete key hierarchy for an attribute. For example, assume flow 704 attempts to retrieve an attribute corresponding to declined transactions over the last X minutes. Because flow 704 has a partial keyset that shares common keys with flow 702 (where the desired data was written), flow 704 is able to retrieve the attribute by way of the common keys (e.g., instrument id or userid). Similarly, assume flow 706 attempts to retrieve an attribute corresponding to declined transactions. Because flow 706 has a partial keyset that shares a common key with flow 702 (where the desired data was written), flow 706 is able to retrieve the attribute by way of the common key (e.g., instrument id).

Figure 8:
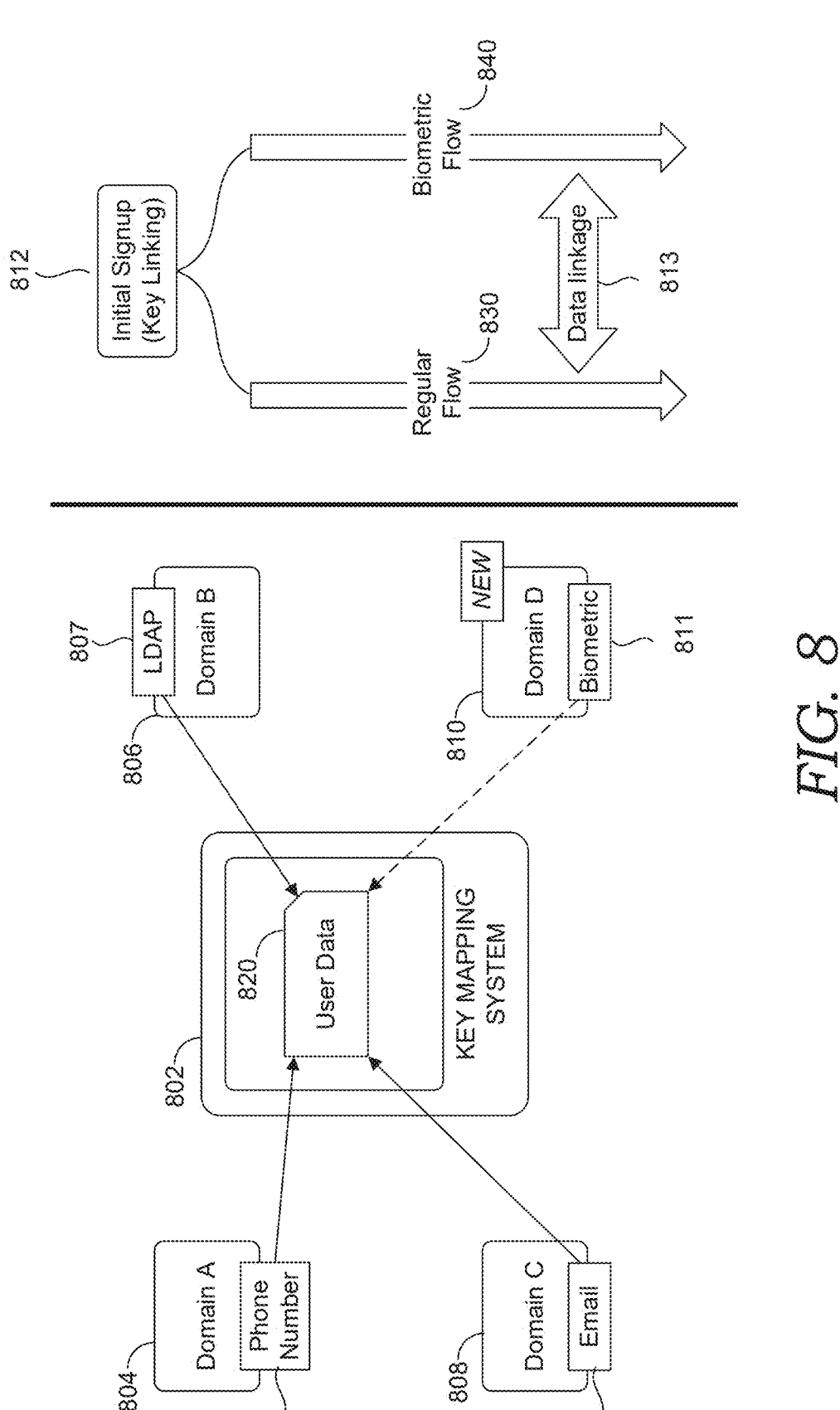
FIG. 8 is an example of context and knowledge sharing abstraction across domains, in accordance with some implementations of the present disclosure.

FIG. 8 depicts a diagram 800 of an example of context and knowledge sharing abstraction across domains, in accordance with some implementations of the present disclosure. As shown, each of Domain A 804, Domain B 806, Domain C 808, and Domain D 810 write different data points for different keys (phone number 805, LDAP 807, email 809, and biometric 811, respectively). During initial signup 812, each of these data points are linked 813 to a common key (user data) 820. For example, assume a typical or regular flow 830 collects phone number 805, LDAP 807, or email 809 information from a user during initial signup. Each of those data points are associated with key user data 820. Now if a biometric flow 340 collects biometric 811 information during initial signup 812 and associates that data point with key user data 820, the key mapping system 802 provides data linkage 813 between all four data points based on the common key user data 820. Accordingly, key mapping system 802 is able to retrieve any of these data points for any of Domain A 804, Domain B 806, Domain C 808, and Domain D 810 by virtue of their linkage by common key 820. In other words, Domain A 804 can retrieve LDAP, email, or biometric data points, Domain B 806 can retrieve phone number, email, or biometric data points, Domain C 808 can retrieve phone number, LDAP, or biometric data points, and Domain D 810 can retrieve phone number, LDAP, or email data points.

With reference now to FIG. 9, a flow diagram is provided that illustrates a method 900 for context and knowledge sharing abstraction using a relational hierarchical key mapping system, in accordance with some implementations of the present disclosure. The method 900 can be performed, for instance, by the key mapping system 106 of FIG. 1. Each block of the method 900 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 910, a first set of one or more data points for a first set of one or more keys is received at a first domain. The first set of one or more data points for the first set of one or more keys are stored in a schema-less data store, at block 912. At block 914, a second set of one or more data points for a second set of one or more keys is received at a second domain. The second set of one or more data points for the second set of one or more keys is stored in the schema-less data store, at block 916. At block 918, based on at least one shared key of the first set of one or more keys and the second set of one or more keys, the first set of one or more data points and the second set of one or more data points are linked as a virtual entity such that a request to retrieve data points of the one or more data points is performed as a single seek and a single application programming interface (API) call. Although examples are described utilizing a first set of one or more keys and a second set of one or more keys, it is contemplated and within the scope of this disclosure that any number of sets of one or more keys in an N-key hierarchy may be leveraged and utilized in the same manner by the key mapping system.

In some aspects, upon receiving a request for a data point of the first set of one or more data points, the data point is provided based on the linking and based on the request comprising a key of the second set of one or more keys. Additionally or alternatively, upon receiving a request for a data point of the second set of one or more data points, the data point is provided based on the linking and based on the request comprising a key of the first set of one or more keys. In some aspects, at least a portion of the first set of one or more data points is restricted from access by the second domain. Additionally or alternatively at least a portion of the second set of one or more data points is restricted from access by the first domain.

Figure 10:
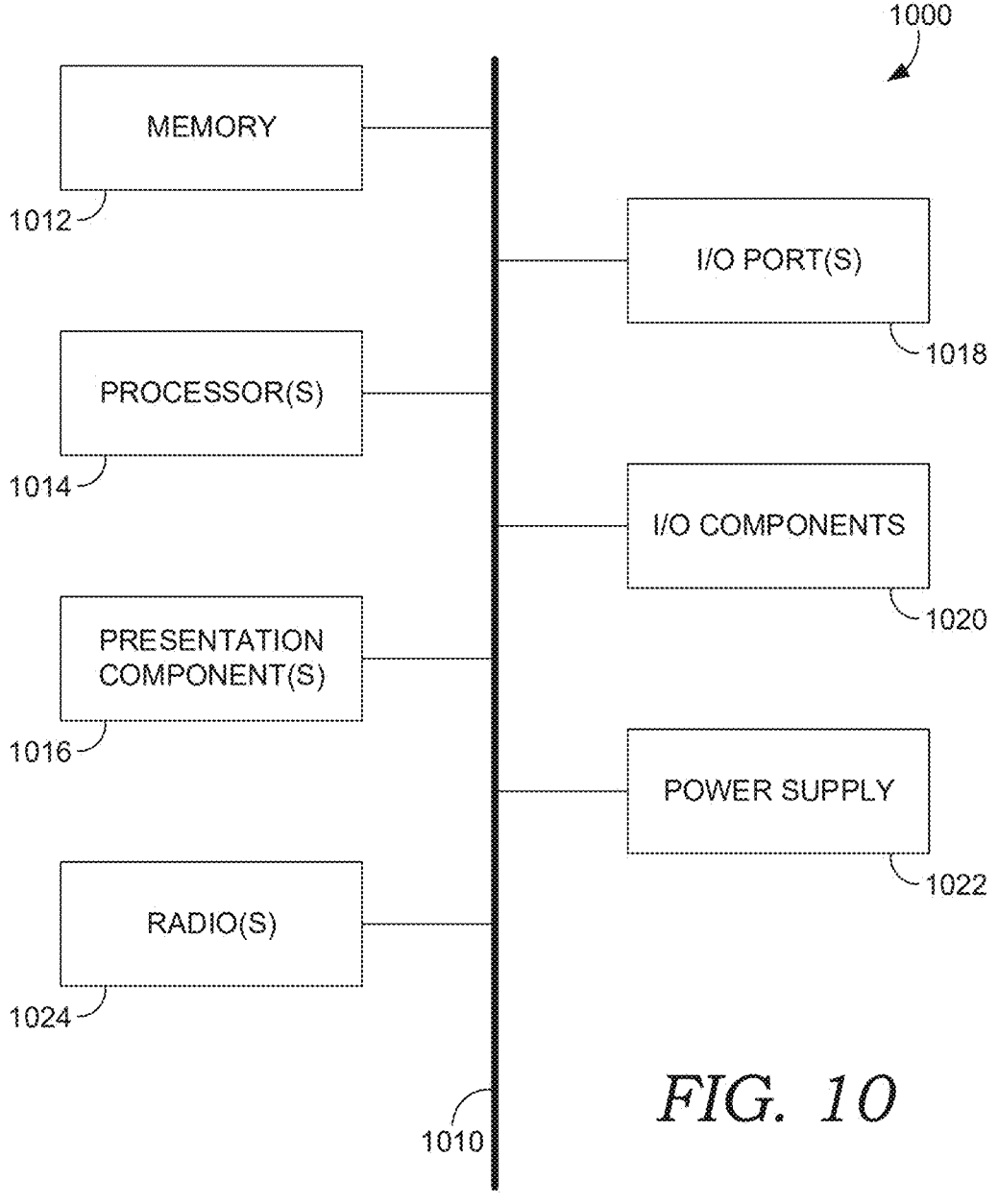
FIG. 10 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 10 in particular, an exemplary operating environment for implementing embodiments of the present technology is shown and designated generally as computing device 1000. Computing device 1000 is but one example of a suitable computing environment and is not intended to suggest any limitation as to the scope of use or functionality of the technology. Neither should the computing device 1000 be interpreted as having any dependency or requirement relating to any one or combination of components illustrated.

The technology can be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what can be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 10 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory can be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which can be built in. Illustrative components include a microphone, joystick, game pad, satellite dish, scanner, printer, wireless device, etc. The I/O components 1020 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1000. The computing device 1000 can be equipped with depth cameras, such as, stereoscopic camera systems, infrared camera systems, RGB camera systems, and combinations of these for gesture detection and recognition. Additionally, the computing device 1000 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more non-transitory computer storage media storing computer-usable instructions that, when used by one or more computing devices, cause the one or more computing devices to perform operations, the operations comprising:

receiving, at a first domain, a first set of one or more data points corresponding to a first set of one or more keys, wherein the first set of one or more keys are associated with key hierarchy connections which are managed independently to allow dynamic activation of key links;

storing the first set of the one or more data points corresponding to the first set of one or more keys in a schema-less data store, wherein the schema-less data store is associated with a key mapping system that maintains metadata about what data points written by a particular application for a particular key;

receiving, at a second domain, a second set of the one or more data points corresponding to a second set of the one or more keys;

storing the second set of the one or more data points corresponding to the second set of the one or more keys in the schema-less data store;

aggregating the one or more data points that belong to a same virtual entity using the key mapping system;

based on at least one shared key of the first set of the one or more keys and the second set of the one or more keys, linking as a virtual entity the first set of the one or more data points and the second set of the one or more data points such that a request to retrieve data points of the one or more data points is performed as a single seek and a single application programming interface (API) call; and restricting at least a portion of the first set of the one or more data points from access by the second domain.

2. The one or more computer storage media of claim 1, further comprising receiving a request for a data point of the first set of the one or more data points, the request comprising a key of the second set of the one or more keys.

3. The one or more computer storage media of claim 2, further comprising, based on the linking, providing the data point corresponding to the request.

4. The one or more computer storage media of claim 1, further comprising receiving a request for a data point of the second set of the one or more data points, the request comprising a key of the first set of the one or more keys.

5. The one or more computer storage media of claim 4, further comprising, based on the linking, providing the data point corresponding to the request.

6. The one or more computer-storage media of claim 1, further comprising restricting at least a portion of the second set of the one or more data points from access by the first domain.

7. A computer-implemented method comprising:

receiving, at a first domain, a first set of one or more data points for a first set of one or more keys, wherein the first set of one or more keys are associated with key hierarchy connections which are managed independently to allow dynamic activation of key links;

storing the first set of the one or more data points for the first set of the one or more keys in a schema-less data store, wherein the schema-less data store is associated with a key mapping system that maintains metadata about what data points written by a particular application for a particular key;

receiving, at a second domain, a second set of the one or more data points for a second set of the one or more keys;

storing the second set of the one or more data points for the second set of the one or more keys in the schema-less data store;

aggregating the one or more data points that belong to a same virtual entity using the key mapping system;

based on at least one shared key of the first set of the one or more keys and the second set of the one or more keys, linking as a directed acyclic graph (DAG) the first set of the one or more data points and the second set of the one or more data points such that a request to retrieve data points of the one or more data points is performed as a single seek and a single application programming interface (API); call and;

restricting at least a portion of the first set of the one or more data points from access by the second domain.

8. The computer-implemented method of claim 7, further comprising receiving a request for a data point of the first set of the one or more data points, the request comprising a key of the second set of the one or more keys.

9. The computer-implemented method of claim 8, further comprising, based on the linking, providing the data point corresponding to the request.

10. The computer-implemented method of claim 7, further comprising receiving a request for a data point of the second set of the one or more data points, the request comprising a key of the first set of the one or more keys.

11. The computer-implemented method of claim 10, further comprising, based on the linking, providing the data point corresponding to the request.

12. The computer-implemented method of claim 7, further comprising restricting at least a portion of the first set of the one or more data points from access by the second domain.

13. The computer-implemented method of claim 7, further comprising restricting at least a portion of the second set of the one or more data points from access by the first domain.

14. A computer system comprising:

one or more processors; and one or more computer storage medium storing computer-usable instructions that, when used by the one or more processors, causes the computer system to perform operations comprising:

receiving, at a first domain, a first set of one or more data points for a first set of one or more keys, wherein the first set of one or more keys are associated with key hierarchy connections which are managed independently to allow dynamic activation of key links;

storing the first set of the one or more data points for the first set of the one or more keys in a schema-less data store, wherein the schema-less data store is associated with a key mapping system that maintains metadata about what data points written by a particular application for a particular key;

receiving, at a second domain, a second set of the one or more data points for a second set of the one or more keys;

storing the second set of the one or more data points for the second set of the one or more keys in the schema-less data store;

receiving a request for a data point of the first set of the one or more data points, the request comprising a key of the second set of the one or more keys;

aggregating the one or more data points that belong to a same virtual entity using the key mapping system;

based on at least one shared key of the first set of the one or more keys and the second set of the one or more keys, providing the data point corresponding to the request in a single seek and a single application programming interface (API) call; and restricting at least a portion of the first set of the one or more data points from access by the second domain.

15. The computer system of claim 14, wherein the first set of the one or more keys and the second set of the one or more keys are dynamically linked as an abstract entity, in real-time, based on the at least one shared key of the first set of the one or more keys and the second set of the one or more keys.

16. The computer system of claim 14, further comprising receiving a request for a data point of the second set of the one or more data points, the request comprising a key of the first set of the one or more keys.

17. The computer system of claim 16, further comprising, based on the linking, providing the data point corresponding to the request.

18. The computer system of claim 14, further comprising restricting at least a portion of the first set of the one or more data points from access by the second domain.

19. The computer system of claim 14, further comprising restricting at least a portion of the second set of the one or more data points from access by the first domain.

* * * * *